United States Patent
Wen et al.

(10) Patent No.: US 7,133,185 B2
(45) Date of Patent: Nov. 7, 2006

(54) MEMS OPTICAL SWITCH WITH SELF-ASSEMBLY STRUCTURE

(75) Inventors: Shih-Yi Wen, Hsinchu (TW); Hsiao-Wen Lee, Hsinchu (TW); Jui-Ping Weng, Hsinchu (TW); Wu-Cheng Kuo, Hsinchu (TW); Chen-Yu Weng, Hsinchu (TW); Yu-Han Chien, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/929,074

(22) Filed: Aug. 27, 2004

(65) Prior Publication Data

US 2005/0286110 A1  Dec. 29, 2005

(30) Foreign Application Priority Data

Jun. 25, 2004 (TW) ............................... 93118512 A

(51) Int. Cl.
*G02F 1/29* (2006.01)
*G02B 6/35* (2006.01)
*G02B 26/08* (2006.01)

(52) U.S. Cl. ........................... 359/298; 385/17; 385/18

(58) Field of Classification Search ................ 359/223, 359/298; 385/17, 18
See application file for complete search history.

(56) References Cited

U.S. PATENT DOCUMENTS

| | | | | |
|---|---|---|---|---|
| 5,629,918 A * | 5/1997 | Ho et al. | ............... | 310/40 MM |
| 5,945,898 A * | 8/1999 | Judy et al. | ............... | 335/78 |
| 5,994,159 A | 11/1999 | Aksyuk et al. | ............... | 438/52 |
| 6,094,293 A * | 7/2000 | Yokoyama et al. | ............... | 359/280 |
| 6,144,781 A | 11/2000 | Goldstein et al. | ............... | 385/18 |
| 6,166,478 A * | 12/2000 | Yi et al. | ............... | 310/328 |
| 6,205,267 B1 | 3/2001 | Aksyuk et al. | ............... | 385/19 |
| 6,215,921 B1 | 4/2001 | Lin | ............... | 385/18 |
| 6,243,507 B1 | 6/2001 | Goldstein et al. | ............... | 385/13 |
| 6,292,600 B1 | 9/2001 | Goldstein et al. | ............... | 385/17 |
| 6,351,051 B1 * | 2/2002 | Sinclair et al. | ............... | 310/166 |
| 6,392,221 B1 | 5/2002 | Aksyuk et al. | ............... | 250/216 |
| 6,445,840 B1 | 9/2002 | Fernandez et al. | ............... | 385/17 |
| 6,445,841 B1 | 9/2002 | Gloeckner et al. | ............... | 385/17 |
| 6,445,846 B1 | 9/2002 | Lin | ............... | 385/18 |
| 6,449,406 B1 | 9/2002 | Fan et al. | ............... | 385/17 |
| 6,498,870 B1 | 12/2002 | Wu et al. | ............... | 385/18 |
| 6,526,198 B1 * | 2/2003 | Wu et al. | ............... | 385/18 |
| 6,556,318 B1 | 4/2003 | Goldstein et al. | ............... | 398/9 |
| 6,556,741 B1 | 4/2003 | Fan | ............... | 385/18 |
| 6,583,031 B1 | 6/2003 | Lin | ............... | 438/459 |
| 6,600,850 B1 | 7/2003 | Fan | ............... | 385/18 |
| 6,606,428 B1 | 8/2003 | Goldstein et al. | ............... | 385/18 |
| 6,618,518 B1 * | 9/2003 | Mahadevan et al. | ............... | 385/18 |
| 6,625,004 B1 * | 9/2003 | Musolf et al. | ............... | 361/278 |

(Continued)

OTHER PUBLICATIONS

Lee et al., "Scratch Drive Actuator Driven Self-assembled Variable Optical Attenuator", Japanese Journal of Applied Physics, vol. 43, No. 6B, Jun. 2004, pp. 3906-3909.*

(Continued)

*Primary Examiner*—David N. Spector
(74) *Attorney, Agent, or Firm*—Welsh & Katz

(57) ABSTRACT

A self-assembly structure of micro electromechanical optical switch utilizes residual stresses of three curved beams. The first curved beam pushes the base plate away from the substrate. The second curved beam lifts up the mirror slightly. Then, the third curved beam rotates the mirror vertical to the base plate and achieves self-assembly. In another embodiment, magnetic force and magnetic-activated elements are used.

7 Claims, 7 Drawing Sheets

U.S. PATENT DOCUMENTS

| | | | |
|---|---|---|---|
| 6,629,461 B1 | 10/2003 | Behin et al. | 73/514.16 |
| 6,785,038 B1* | 8/2004 | Hichwa et al. | 359/290 |
| 6,866,255 B1* | 3/2005 | Fork et al. | 267/37.1 |
| 6,933,165 B1* | 8/2005 | Musolf et al. | 438/50 |

OTHER PUBLICATIONS

Lee et al., "A New Micromechanism for Transformation of Small Displacements to Large Rotations for a VOA", IEEE Sensors Journal, vol. 4, No. 4, Aug. 2004, pp. 503-509.*

Li et al., "Integrated Self-assembling and Holding Technique Applied to 3-D MEMS Variable Optical Attenuator", Journal of Microelectromechanical Systems, vol. 13, No. 1, Feb. 2004, pp. 83-90.*

Aksyuk et al., "Stress Induced Curvature Engineering in Surface Micromachined Devices", Symposium on Design, Test, and Microfabrication of MEMS and MOEMS, Paris, France, Mar.-Apr. 1999, SPIE vol. 3680, pp. 984-993.*

Chen, et al, IEEE Photonics Technology Letters, vol. 11, No. 11, Nov. 1999—A High-Speed Low-Voltage Stress-Induced Micromachined 2×2 Optical Switch; pp. 1396-1398.

Ho et al., 2002 IEEE/LEOS International Conference on Optical MEMS—A Robust and Reliable Stress-Induced Self-Assembly Mechanism for Optical Devices; pp. 131-132.

Miller et al., Microrelay Packaging Technology Using Flip-Chip Assembly; NSF Center for Advanced Manufacturing and Packaging of Microwave, Optical, and Digital Electronics; 6 Pages.

* cited by examiner

MEMS OPTICAL SWITCH WITH SELF-ASSEMBLY STRUCTURE

FIELD OF THE INVENTION

The invention relates to micro electromechanical optical switches applicable to optical communication industry, and especially relates to a self-assembly structure of micro electromechanical optical switch utilizing residual stress.

BACKGROUND OF THE INVENTION

In recent years, microelectromechanical Systems (MEMS) plays a great role in the development of optical systems. MEMS provides a semiconductor-like lithographic batch fabrication process which makes it easy to make micromechanical and microoptical elements integrated with control electronics on a single chip. By combining with the microoptics or waveguides, it grants the flexibility of light path design to be free-space or guided-wave. This advanced technology has been leveraged to create many crucial components for telecommunication application, such as optical switches, variable optical attenuators, tunable filters. The invention is one of the optical switches utilizing MEMS technology.

U.S. Pat. No. 6,292,600 discloses a free-rotating hinged micro-mirror switching element operated in "open" and "close" states. The micro-mirror comprises a mirror connected to the substrate by free-rotating micro-hinges. The hinges include one or more hinge pins and one or more hinge staples. Pushrods are connected at one end to the mirror and at the opposite end to the translation stage with hinge joints. And the actuated component is the scratch-drive actuator (SDA). Through applying appropriate voltage to the SDA, the SDA can be deformed or moved to a certain extent. The deformation or movement in turn causes the pushrods to act upon the mirror and rotate it to a predetermined position or angle from the substrate. Such design is able to turn the linear movement of the pushrods into rotation of the mirror and relatively reduce the entire device dimensions. However, because the degree of freedom of the mirror rotation is extremely sensitive to the optical fiber coupling efficiency, the mirror rotation angle has to be precisely controlled and encounters much difficulty.

Besides, in U.S. Pat. Nos. 6,526,198 and 6,556,741, the micro-mirror switch includes a substrate, an electrode coupled to the substrate, and a micromachined plate rotatably coupled to the substrate about a pivot axis. The micromirror has an orientated reflective surface mounted to the micromachined plate. An electrical source is coupled to the electrode and the micromachined plate. When voltage is applied, the electrostatic force causes the actuator move downward. The high reflection mirror surface is assembled to the actuator and perpendicular to the substrate. In order to avoid causing electrical short when the mirror moves down, a landing electrode with a buckle beam is specially used. Though the structure may provide precise movement, but each optical switch element needs additional assembly, which consumes time and a lot of work.

SUMMARY OF THE INVENTION

In order to solve the above problems, the invention provides a micro electromechanical optical switch having a self-assembly structure. The assembly cost and error are reduced by the self-assembly mechanism.

The self-assembly structure of micro electromechanical optical switch of the invention mainly includes a substrate, a base plate, a mirror and three stress-induced curved beams (respectively as first curved beam, second curved beam and third curved beam). One end of the base plate is pivoted on the substrate. Another end is a curved free portion extending from the pivot portion. A side of the mirror is pivoted on the base plate. One end of the first curved beam is fixed on the substrate; the other end is located between the base plate and the substrate so that the residual stress of the first curved beam lifts the base plate upward and away from the substrate. On the other hand, one end of the second curved beam is anchored on the base plate; the other end is located under the mirror. One end of the third curved beam is also anchored on the base plate; the other end is located at the pivot potion of the mirror. The residual stress of the second curved beam lifts the mirror slightly. Then, the third curved beam rotates the mirror up about vertical to the base plate, and accomplish the self-assembly.

Furthermore, the invention includes magnetic-activated elements on the mirror and the base plate. So that, an external magnetic force can be applied to control the relative position of the mirror and the base plate and achieve self-assembly.

BRIEF DESCRIPTION OF THE DRAWINGS

The invention will become more fully understood from the detailed description given herein below. However, this description is for purposes of illustration only, and thus is not limitative of the invention, wherein.

DETAILED DESCRIPTION OF THE INVENTION

Figure 1A:
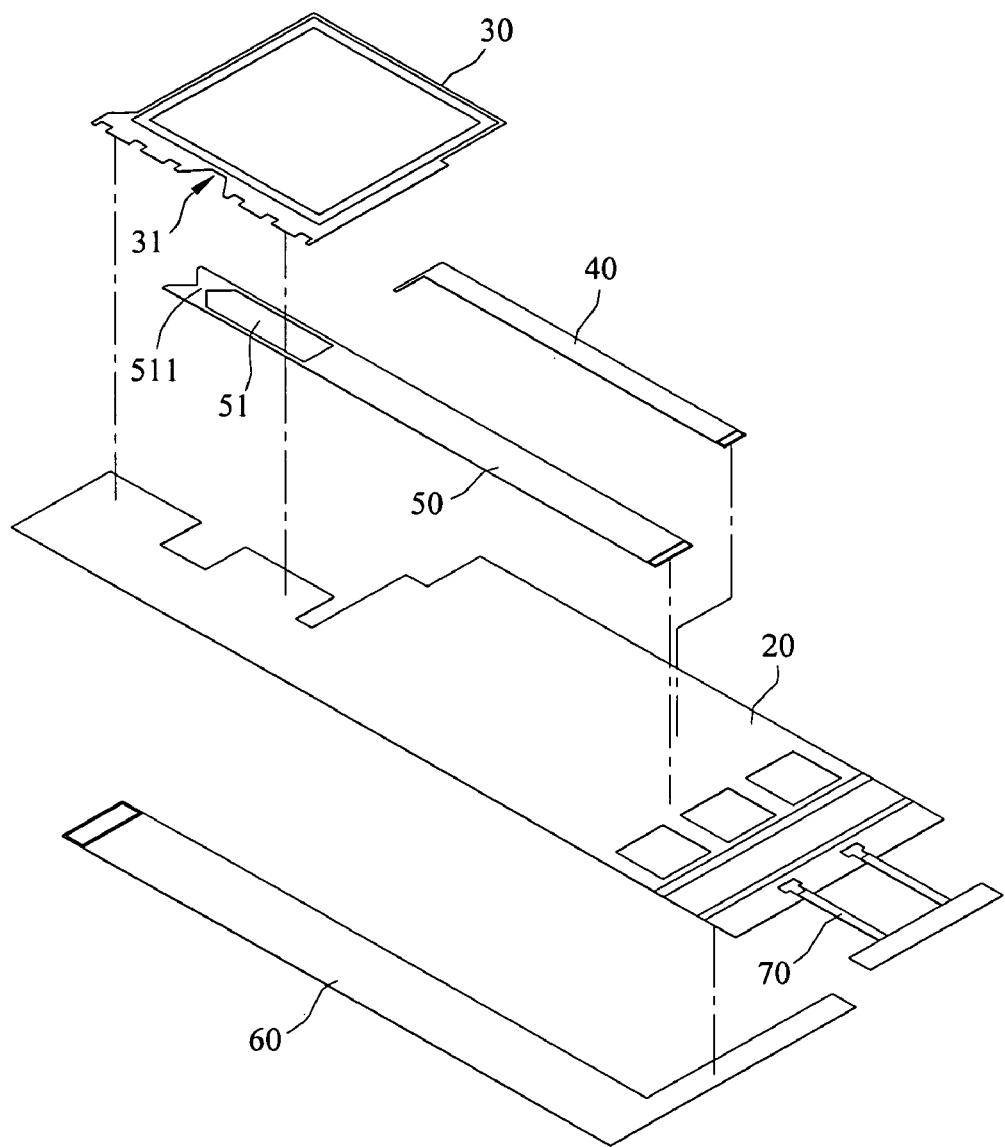
FIG. 1A is an exploded view of the optical switch of the invention.
Figure 1B:
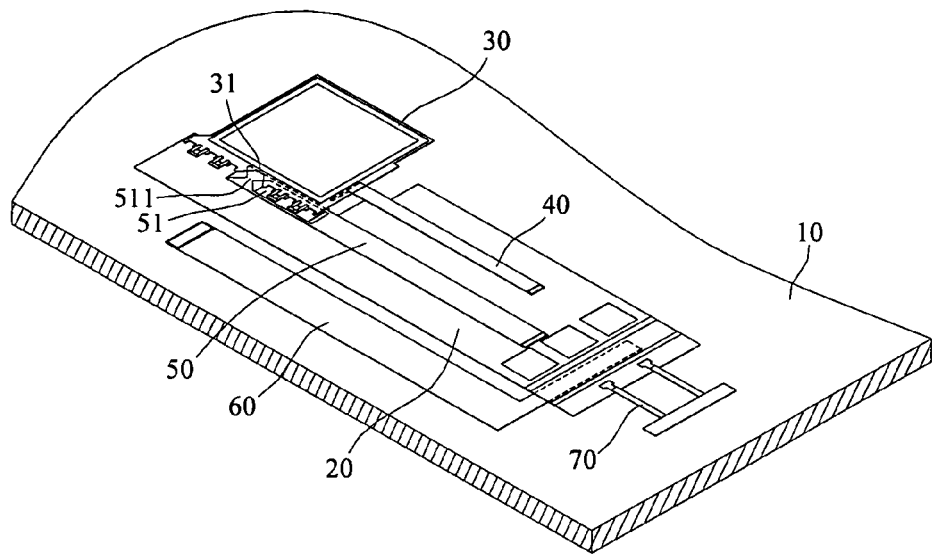
FIG. 1B is a stereogram of the optical switch of the invention.

FIGS. 1A and 1B illustrate a self-assembly structure of a micro electromechanical optical switch according to the invention. The optical switch includes a substrate 10, a base plate 20, a mirror 30, a first curved beam 40, a second curved beam 60; and a third curved beam 50. All of three curved beam are formed by stress engineering process. That means they are stress-induced curved beams. One end of the base plate 20 is pivoted on the substrate 10; the other end (the left end in the drawing) is free. One side of the mirror 30 is pivoted on the base plate 20.

One end of the first curved beam 40 is fixed to the substrate 10; the other end extends to a position between the substrate 10 and the base plate 20. One end of the second curved beam 60 is anchored on the base plate 20; the other end extends to a position under the mirror 30 and about the central portion. One end of the third curved beam 50 is anchored on the base plate 20; the other end (the front end) extends to the pivot portion of the mirror 30 connecting to the base plate 20. The front end of the third curved beam 50 is formed with an opening 51 and a tenon 511.

Figure 2:
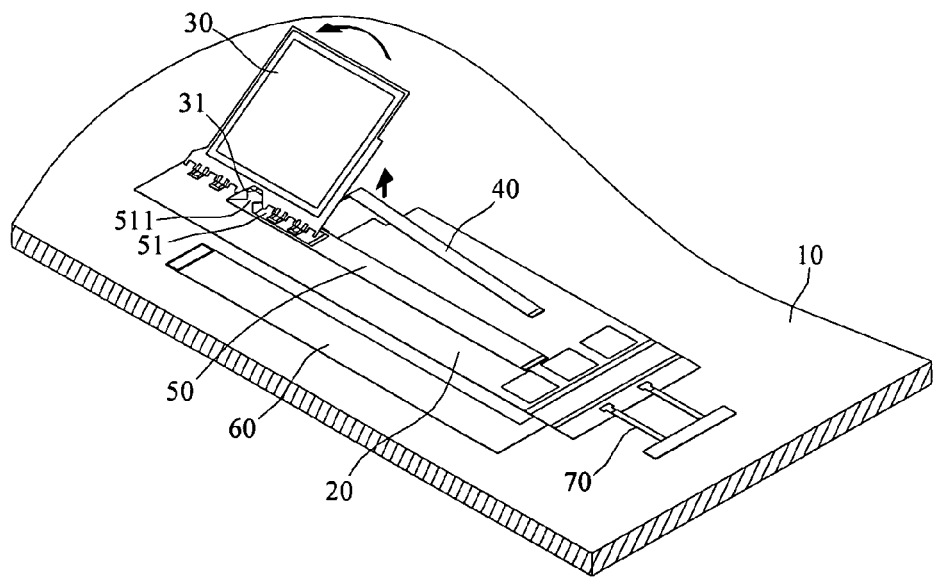
FIG. 2 is a stereogram of the invention where the mirror is lifted slightly.
Figure 3A:
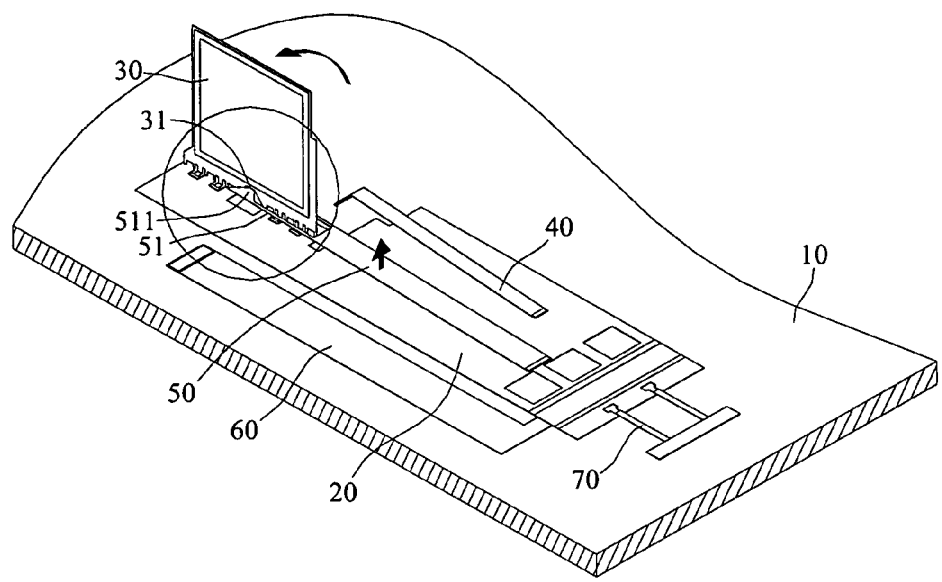
FIGS. 3A and 3B are a stereogram of the invention where the mirror is lifted uprightly.
Figure 3B:
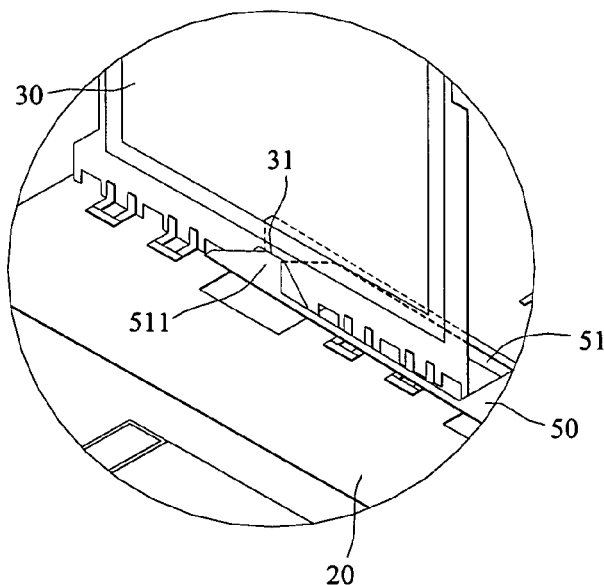
Figure 4:
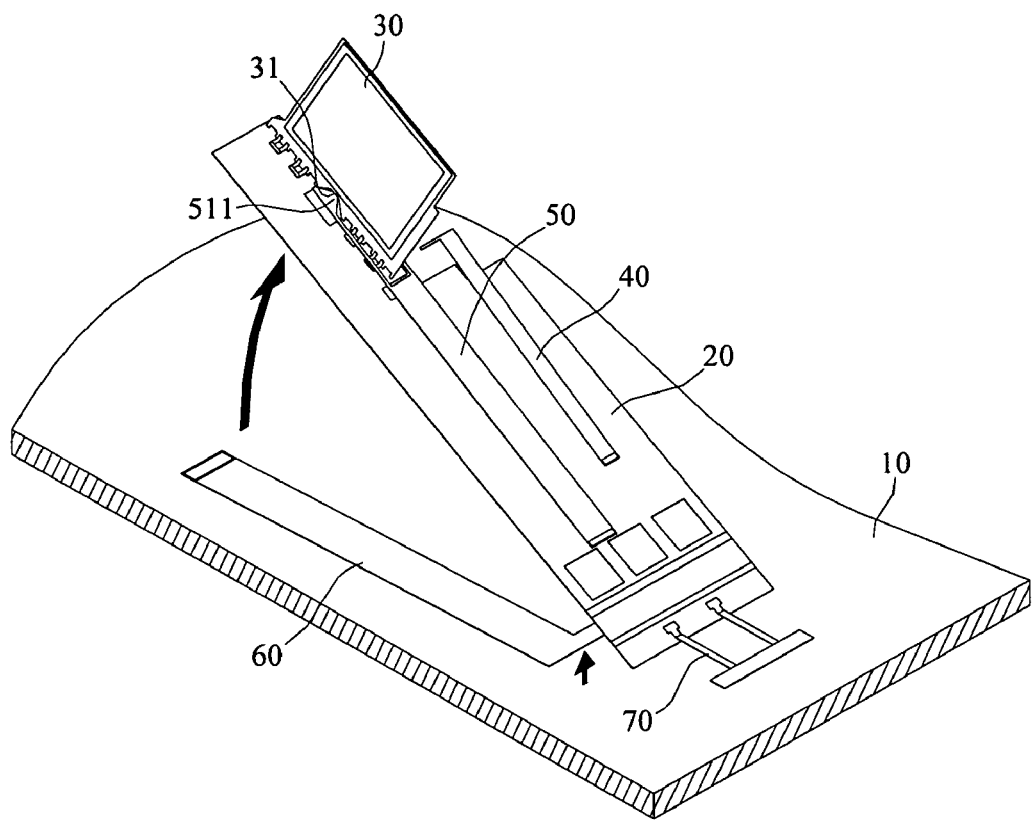
FIG. 4 is an explanatory view of function of the curved beam that lifts the base plate by residual stress.

As shown in FIG. 2, by residual stress of the second curved beam 60, the end of the second curved beam bends up and lifts the mirror 30 rotating slightly with the pivot portion and away from base plate 20. As shown in FIGS. 3A and 3B, the residual stress of the third curved beam 50 bends up the front end of the beam, causes the tenon 511 engaging with a cutoff 31 formed on the mirror 30 to lift the mirror 30 vertically to the base plate 20. As shown in FIG. 4, the front end of the first curved beam 40 bends upward, lifts the base plate 20 to rotate from the substrate 10 by its pivot portion. Because the bend-up angle of the first curved beam 40 is limited, if the base plate 20 needs a great angle of lift-up, then we can make the front end of the first curved beam 40 approach the pivot portion of the base plate 20 that links with the substrate 10, and use a drawbridge 70 to assist the required positioning angle.

Figure 5A:
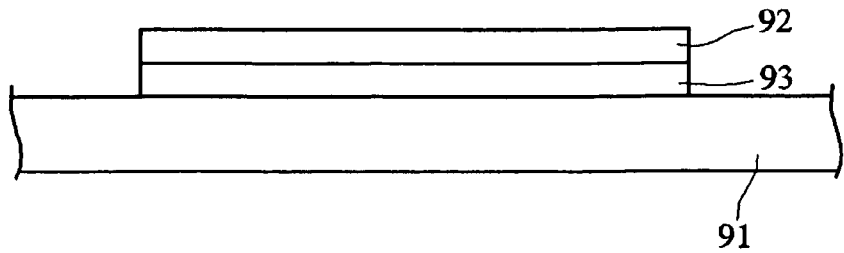
FIGS. 5A and 5B are explanatory views of the first embodiment of the curved beam.
Figure 5B:
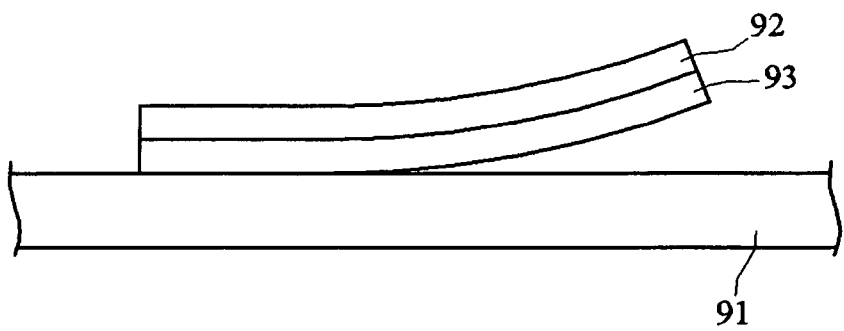

As shown in FIGS. 5A, 5B, they are explanatory views of the first embodiment of the curved beam. Two layers 92, 93 with different thermal-expansion coefficients are formed on a subtract 91. The upper layer 92 are fully attached with the lower layer 93 and one end (left end in the drawing) of the lower layer 93 is fixed on the subtract 91. When applying electric current to the upper and lower layer 92, 93 to heat them up, the upper and lower layer 92, 93 will bend as shown in FIG. 5B due to their different thermal-expansion coefficients. This is the first embodiment of the curved beam.

Figure 6A:
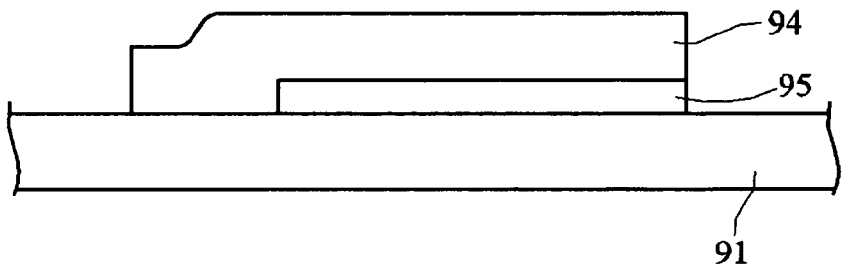
FIGS. 6A and 6B are explanatory views of the second embodiment of the-curved beam.
Figure 6B:
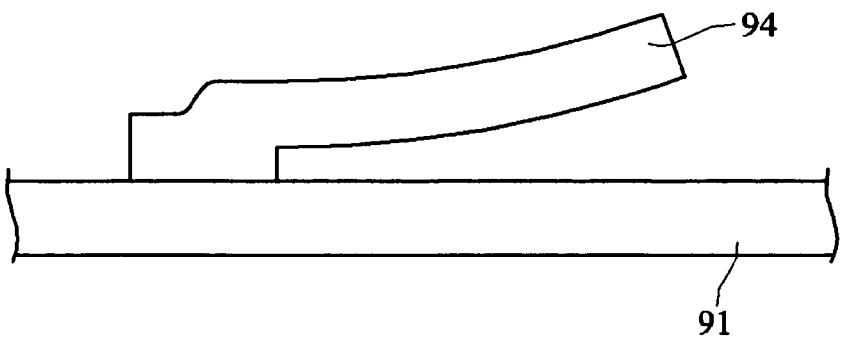

Please refer to FIGS. 6A and 6B; they are explanatory views of the second embodiment of the curved beam. The upper layer 94 is fixed at one end on the subtract 91 and is made of a layer with an induced stress gradient therein. The lower layer 95 is sandwiched between the upper layer 94 and the subtract 91. After removing the lower layer 95, the upper layer 94 will bend as shown in FIG. 6B due to the residual stress inside the upper layer 94. According to the theory of material mechanics, a double-layer plate structure with known thickness, Young's modulus and uniform stress values $\sigma_1$ and $\sigma_2$ respectively, then its radius of curvature $\rho$ and the displacement $\delta$ are calculated:

$$\frac{1}{\rho} = \frac{6(m\sigma_2 - \sigma_1)}{hE_2(2m + K[n(1+n)^2]^{-1})}$$

$$\delta = \rho(1 - \cos(L/\rho))$$

$$K = 1 + 4mn + 6mn^2 + 4mn^3 + m^2n^4$$

in which m is the Young's modulus ratio of the double-layer plate; n is thickness ratio of the doubling plate and L is the cantilever length.

Table 1 shows some examples of calculation. The materials respectively are silicon rich nitride and poly-silicon. The Young's modulus of silicon rich nitride is 300 Gpa and its residual stress is 100 Mpa The thickness of. The Young's modulus of poly-silicon is 160 Gpa and mean residual stress value is 0 Mpa. The thickness is 0.4 um for silicon rich nitride and 2 um for poly-silicon. There have been a lot of related researches of prior arts. The listed examples are just embodiments. They are certainly not limited to the two materials.

TABLE 1

| Cantilever length | Displacement (theoretical) | Displacement (finite element) |
| --- | --- | --- |
| 500 um | 12.132 um | 12.9492 um |
| 750 um | 27.29 um | 28.6235 um |
| 1000 um | 48.499 um | 50.4397 um |
| 1250 um | 75.746 um | 78.3963 um |

Figure 7A:
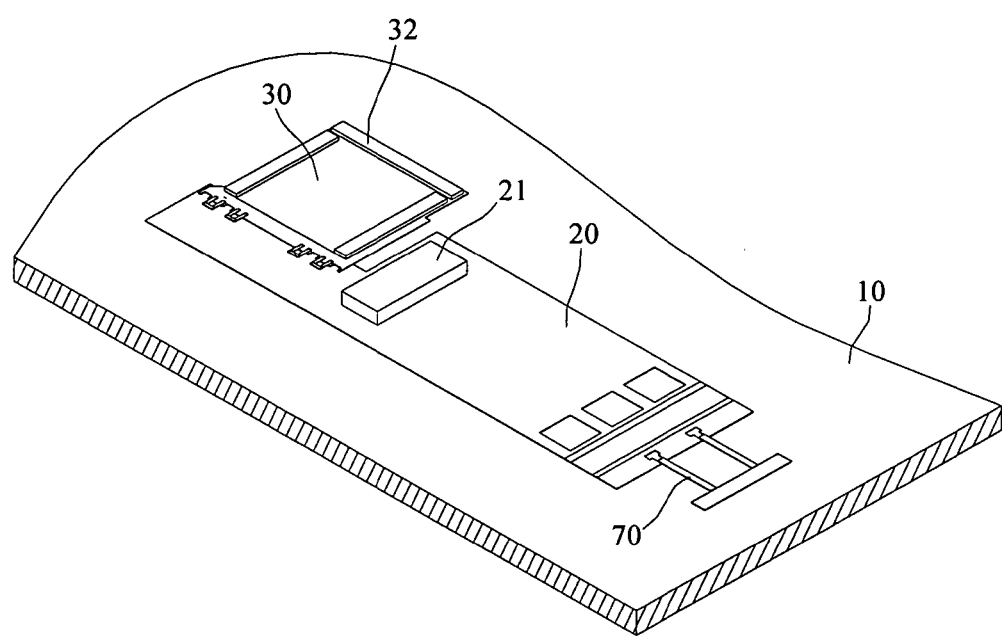
FIGS. 7A and 7B are stereogram of the second embodiment of the invention applying magnetic-activated elements.
Figure 7B:
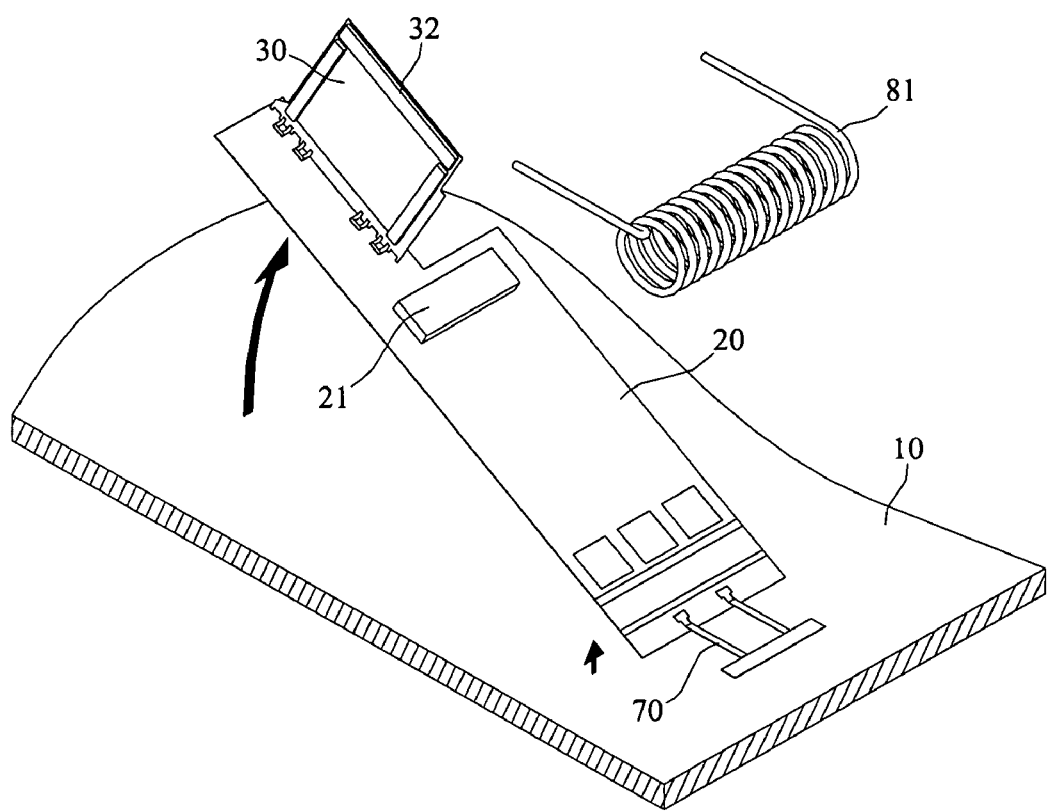

On the other hand, please refer to FIGS. 7A and 7B, there are magnetic-activated elements 32 and 21 (such as permalloy) added on the mirror 30 and the base plate 20 respectively. By applying an exterior magnetic field (as shown in the drawing a coil 81), thorough different volumes and assembly resilience of the magnetic-activated elements 32 and 21, the mirror 30 and the base plate 20 are self-assembled. This mechanism substitutes the above first curved beam 40, second curved beam 60 and third curved beam 50 (in FIGS. 1A and 1B) and directly utilizes the magnetic force for assembly instead of using residual stress. The permalloy material can be chosen from soft magnetic materials such as nickel (Ni), ferronickel (Ni—Fe), nickel cobalt alloy (Ni—Co) and so on, or retentive materials such as ferro-neodymium boron (Nd—Fe—B), samarium cobalt alloy (Sm—Co) and so on.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A micro electromechanical optical switch, comprising:
   a substrate;
   a base plate, having an end pivoted to said substrate, and another end being free;
   a first stress-induced curved beam, having an end anchored on said substrate, and another end extending from said anchored end to a position between said base plate and said substrate;
   a mirror, having a side pivoted to said base plate; and
   a second stress-induced curved beam, having an end anchored on said base plate, and another end extending to a position under said mirror;
   wherein residual stress in said first curved beam bends itself to lift up said end extending to said position between said base plate and said substrate, and rotate said free end of said base plate away from said substrate by said pivoted end;
   residual stress in said second curved beam bends itself to lift up said end extending to said position under said mirror, and rotate said mirror away from said substrate by said pivoted side.

2. The micro electromechanical optical switch according to claim 1 further comprises a third stress-induced curved beam having an end anchored on said base plate, and another end extending to said pivoted side of said mirror.

3. The micro electromechanical optical switch according to claim 2 wherein said third curved beam having a front end formed with a tenon engaging with said mirror for turning said mirror vertical to said base plate.

4. The micro electromechanical optical switch according to claim 1 wherein each of said curved beam is composed of at least a structural layer of specific material.

5. The micro electromechanical optical switch according to claim 4 wherein each of said curved beam is composed of two structural layers of materials with different thermal-expansion coefficients.

6. The micro electromechanical optical switch according to claim 4 wherein said structural layer is a layer with an induced stress gradient therein.

7. The micro electromechanical optical switch according to claim 1 wherein said pivoted end of said base plate comprises a drawbridge having an end connected to said base plate and another end connected to said substrate.

* * * * *